United States Patent
Noguchi et al.

(10) Patent No.: US 7,814,563 B2
(45) Date of Patent: Oct. 12, 2010

(54) RECORDING/PLAYBACK SYSTEM FOR MEDIUM COMPLIANT TO COPY CONTROL

(75) Inventors: Takaharu Noguchi, Yokohama (JP); Akira Shibata, Fujisawa (JP); Hitoaki Owashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1251 days.

(21) Appl. No.: 11/236,725

(22) Filed: Sep. 28, 2005

(65) Prior Publication Data
US 2006/0067530 A1    Mar. 30, 2006

(30) Foreign Application Priority Data
Sep. 30, 2004 (JP) ............................. 2004-285636

(51) Int. Cl.
G06F 7/04 (2006.01)
H04N 7/167 (2006.01)

(52) U.S. Cl. ........................................ 726/31; 380/201

(58) Field of Classification Search .................. 726/31, 726/27; 386/94, 95, 125, 126; 380/201
See application file for complete search history.

(56) References Cited

U.S. PATENT DOCUMENTS

| | | | |
|---|---|---|---|
| 6,189,064 B1 | 2/2001 | MacInnis et al. | |
| 6,272,286 B1* | 8/2001 | Asada et al. | 386/126 |
| 2004/0027942 A1 | 2/2004 | Sako | |
| 2004/0161108 A1* | 8/2004 | Ando et al. | 380/201 |
| 2005/0039204 A1* | 2/2005 | Neuman et al. | 725/31 |

FOREIGN PATENT DOCUMENTS

| | | |
|---|---|---|
| JP | 2001-086445 | 3/2001 |
| WO | WO 2004/104759 | 12/2004 |

OTHER PUBLICATIONS

DVD Content Scramble System, National Technical Report, vol. 43, No. 3, Jun. 1997.
Office Action issued in Chinese Patent Application No. 2005101079666 on Jan. 4, 2008.
Office Action issued in Chinese Patent Application No. 2005101079666 on Nov. 28, 2008.
Office Action issued in Chinese Patent Application No. 2005101079666 on Sep. 25, 2009.

* cited by examiner

*Primary Examiner*—Matthew B Smithers
*Assistant Examiner*—Ali S Abyaneh
(74) *Attorney, Agent, or Firm*—Antonelli, Terry, Stout & Kraus, LLP.

(57) ABSTRACT

By introducing a new copy control system into video signals subjected to picture quality restriction satisfactory only in small-sized PMP displays, a new business model in which copyrighters, consumers and makers can have mutual prosperity is created. "A new copy control rule of prohibiting a video signal output with a picture quality equivalent to that at time of recording from being copied, but permitting a video signal sufficiently degraded in picture quality as compared with time of recording to be copied" is added to the copy-never, copy-one-generation, and copy-free states belonging to the conventional copy control rule. The quality for which the copyrighter can permit copying corresponds to half the current number of DVD pixels. If a quality restricting scheme of thinning out pixels to half compared with time of recording is used, therefore, needs of consumers desiring to enjoy PMPs are satisfied while protecting rights of copyrighters.

9 Claims, 2 Drawing Sheets

FIG.3

| PMP DISPLAY NUMBER OF PIXELS | (a) HORIZONTAL : VERTICAL (320 TO 352) : 480 | (b) HORIZONTAL : VERTICAL 480 : 270 | (c) HORIZONTAL : VERTICAL (320 TO 352) : 240 |
|---|---|---|---|
| HORIZONTAL : VERTICAL (A) 704 : 480 | REDUCE NUMBER OF HORIZONTAL PIXELS TO HALF | REDUCE NUMBER OF VERTICAL PIXELS TO HALF | REDUCE NUMBER OF HORIZONTAL PIXELS TO HALF<br><br>REDUCE NUMBER OF VERTICAL PIXELS TO HALF |
| (B) 640 : 480 | REDUCE NUMBER OF HORIZONTAL PIXELS TO HALF | REDUCE NUMBER OF VERTICAL PIXELS TO HALF | REDUCE NUMBER OF HORIZONTAL PIXELS TO HALF<br><br>REDUCE NUMBER OF VERTICAL PIXELS TO HALF |
| (C) 1920 : 1080 | REDUCE NUMBER OF HORIZONTAL PIXELS TO ONE SIXTH<br><br>REDUCE NUMBER OF VERTICAL PIXELS TO HALF TO ONE THIRD | REDUCE NUMBER OF HORIZONTAL PIXELS TO ONE FOURTH<br><br>REDUCE NUMBER OF VERTICAL PIXELS TO ONE FOURTH | REDUCE NUMBER OF HORIZONTAL PIXELS TO ONE SIXTH<br><br>REDUCE NUMBER OF VERTICAL PIXELS TO ONE FOURTH |

FIG.4

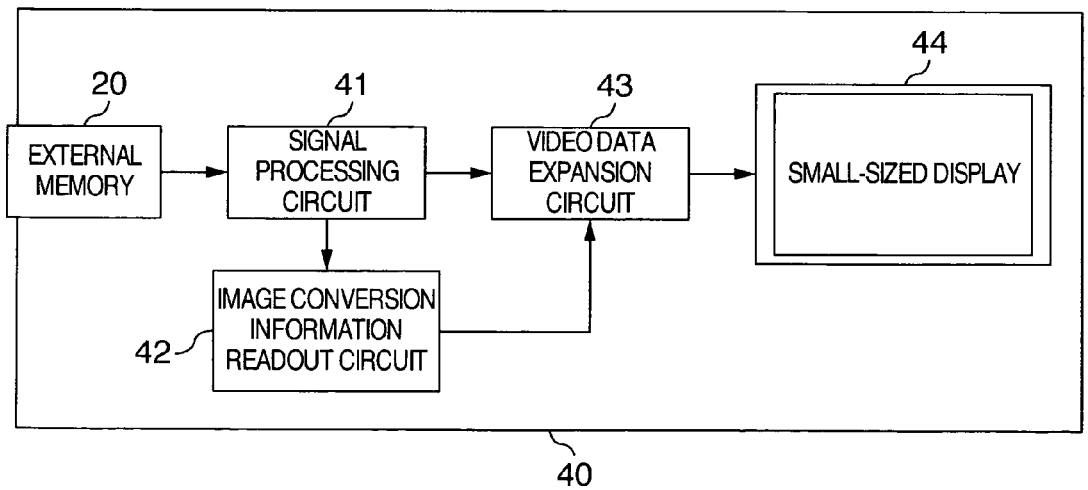

RECORDING/PLAYBACK SYSTEM FOR MEDIUM COMPLIANT TO COPY CONTROL

INCORPORATION BY REFERENCE

The present application claims priority from Japanese application JP2004-285636 filed on Sep. 30, 2004, the content of which is hereby incorporated by reference into this application.

BACKGROUND OF THE INVENTION

The present invention relates to a recording/playback system of contents distribution media corresponding to a new copy control system in which a play video signal retaining a picture quality obtained at the time of recording is prohibited to be copied, but a played back video signal sufficiently degraded in picture quality as compared with the picture quality obtained at the time of recording is permitted to be copied.

Representation of the contents distribution media is a DVD disk. A mechanism for protecting a DVD disk from being copied is described in, for example, JP-A-2001-86445. As the copy control information, copy control information CGMS (Copy Generation Management System) concerning the copy condition such as copy-never (copying is prohibited), copy-one-generation or copy-once (copying only once is permitted), or copy-free (copying is permitted) is adopted.

Furthermore, as for DVD disks and DVD players, an example of DVD copy protection system CSS (Content Scramble System) for preventing ordinary users from conducting illegal copying is described in National Technical Report, Vol. 43, No. 3, June 1997, pp. 339-341.

In the DVD disks, each of almost all movie software DVDs have a copy-never code multiplexed in a CGMS provision area on the DVD disk in accordance with an intention of a copyright holder, and CGMS-A or CGMS-D indicating the copy-never state is added to the analog or digital video signal output. Even if the copyright holder has an intention to permit the copying provided that a definite picture quality degradation is given, a DVD video signal prohibited to be copied cannot be copied onto a small-sized HDD or flash memory under the current copy control rule and it is impossible to enjoy DVD movie software using a portable movie player (PMP) having a small screen in outdoors or the like.

SUMMARY OF THE INVENTION

Copyright holders owning movie software desire to decrease illegal copies to the utmost. On the other hand, they have an eager desire to increase the value added in contents business represented by DVD movies sold by themselves, i.e., find out new market needs. A shortcut for implementing "ubiquitous movie in which movies can be enjoyed anywhere any time" is to make it possible to enjoy DVD movie software on a PMP as well. Specifically, the subject is to create a new business model in which three parties, i.e., a copyright holder, a consumer and a maker can have mutual prosperity in coexistence by introducing a new copy control system into video signals having a picture quality restriction that is satisfactory only in small-sized displays of the PMPs.

An object of the present invention is to contribute to providing the copyright holder, consumer and maker with merits.

The object is achieved by providing "a new copy control rule of prohibiting a video signal output with a picture quality equivalent to that at the time of recording from being copied, but permitting a video signal sufficiently degraded in picture quality as compared with that at the time of recording to be copied" in addition to the copy-never, copy-one-generation, and copy-free states which belong to the conventional copy control rule.

The picture quality for which the copyright holder can permit the copying corresponds to approximately half of the current number of DVD pixels (the number of horizontal pixels is 704 and the number of vertical pixels is 480). On the other hand, the number of pixels in the PMP display is approximately 352 in the horizontal direction and is in the range of approximately 240 to 480 in the vertical direction. If a picture quality restricting scheme of thinning out the number of all pixels, which is the product of the number of horizontal pixels and the number of vertical pixels, to half or less the number of pixels at the time of recording is used, needs of consumers who want to enjoy the PMP can be satisfied while protecting the rights of copyright holders.

According to the present invention, copyright holders, makers and consumers are provided with merits.

BRIEF DESCRIPTION OF THE DRAWINGS

These and other features, objects and advantages of the present invention will become more apparent from the following description when taken in conjunction with the accompanying drawings wherein:

FIG. 3 is a table showing an embodiment of conversion contents of a circuit for converting the number of pixels according to the present invention; and FIG. 4 is a block diagram showing an embodiment of a PMP according to the present invention.

DESCRIPTION OF THE EMBODIMENTS

According to the present embodiment, a new copy control system that prohibits a played back video signal retaining a picture quality obtained at the time of recording from being copied, but permits a video signal sufficiently degraded in picture quality as compared with that at the time of recording to be copied is developed. It is made possible to record a played back video signal of movie software degraded in picture quality on a recording medium of a PMP. A recording/playback scheme of a contents distribution medium suitable for playback in the PMP is provided.

Figure 1:
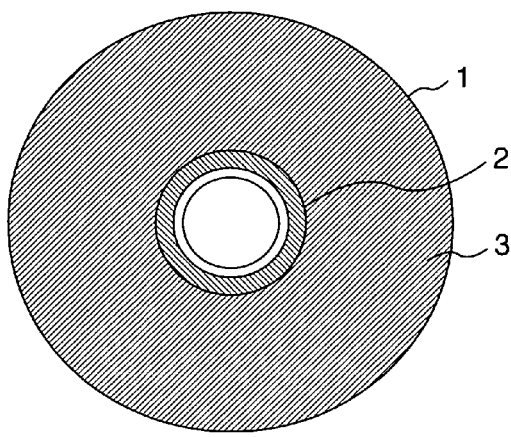
FIG. 1 is a diagram showing an embodiment of a contents distribution medium according to the present invention.

FIG. 1 shows a configuration example of an embodiment of a contents distribution medium. Reference numeral 1 denotes an optical disk medium. Numeral 2 denotes an area where information indicating that the new copy control system is adopted is recorded. Numeral 3 denotes an area where contents containing video and audio information and copy control information that can cope with the new copy control system are recorded.

The contents distribution medium of the embodiment shown in FIG. 1 will now be described. An optical disk having a diameter of 12 cm equivalent to that of a DVD is used as the optical disk medium. Conventional first copy control information and new second copy control information are recorded in the area 3. The conventional first copy control information specifies video data obtained by conducting MPEG2 compression on video information having the number of horizontal pixels equivalent to 704 and the number of vertical pixels equivalent to 480, i.e., the number of all pixels equivalent to 337 K, audio data subjected to AC3 compression, caption data the CGMS, as copy prohibition. The new second copy control information means that "a video signal output in which the number of pixels is restricted to 168 K less than half of that used at the time of recording is permitted to be copied" corresponding to the new copy control system. In the case where two bits of the CGMS in the CPR_MAI (Copyright Management Information) recording area in a data frame on the conventional DVD are used as a recording method of the new second copy control information, reserved "01" can also be diverted to the two bits. Definition of the copy control information in this case becomes "coexistence of "01" in CSS and CGMS permits a played back signal restricted in the number of pixels to be copied". In a lead-in area in the area 2, new third copy control information indicating that "the optical disk adopts the new copy control system is adopted" is recorded. In addition to this, information representing the number of pixels in the recorded image, information representing the number of pixels at which copying is permitted, or information prescribing whether copy permission given when the number of pixels is restricted is copy-free or copy-one-generation can also be recorded as the new third copy control information.

As for the new second copy control information, a scheme of adding data having the same form as that of the copy control information prescribing the CGMS adopted by the current DVDs may be used, or a scheme of embedding the new second copy control information in the video information by using a video water mark (WM) form may be used.

When the WM scheme is used, "veil" which is a one-bit WM is adopted. If the veil is present, it is meant that "if the restriction on the number of pixels is present, copying is permitted". If the veil is not present, it can be specified that "even if the number of pixels is restricted, copying is prohibited".

If a WM having at least two bits is adopted, it is possible to provide new copy control information using a copy permission code with a restriction in the number of pixels in addition to the conventional copy prohibition code.

The purpose in adding the new second and third copy control information is to play back a DVD medium corresponding to the new copy control system in a conventional DVD player as before and make it possible for only a new DVD player corresponding to the new copy control system to output a video signal output restricted in the number of pixels that can be copied. Therefore, the object can be implemented by using the new second or third copy control information alone.

The example in which the present invention is applied to the current DVD format has been described heretofore. Hereafter, the case where the present invention is applied to the Blu-ray disc format or the HD DVD format will be described.

HD video information recorded in the area 3 has the number of horizontal pixels equivalent to 1920 and the number of vertical pixels equivalent to 1080. The number of all pixels becomes 2073 K. Video data obtained by compressing the video information by using MPEG2/HL, H.264 AVC, VC9 is recorded. The copy control rule in this case becomes as described below.

It is obligatory to conduct encryption and add a copying prohibition code, for a played back video signal output having 2073 K, which is equivalent to the number of pixels used at the time of recording. It is obligatory to restrict the number of all pixels to 540 K or less and add a CGMS code functioning as a copying prohibition code, for a played back video signal output that is not encrypted. A CGMS code indicating that copying is permitted is allowed only for a played back video signal output restricted in the number of all pixels to 168 K or less.

Figure 2:
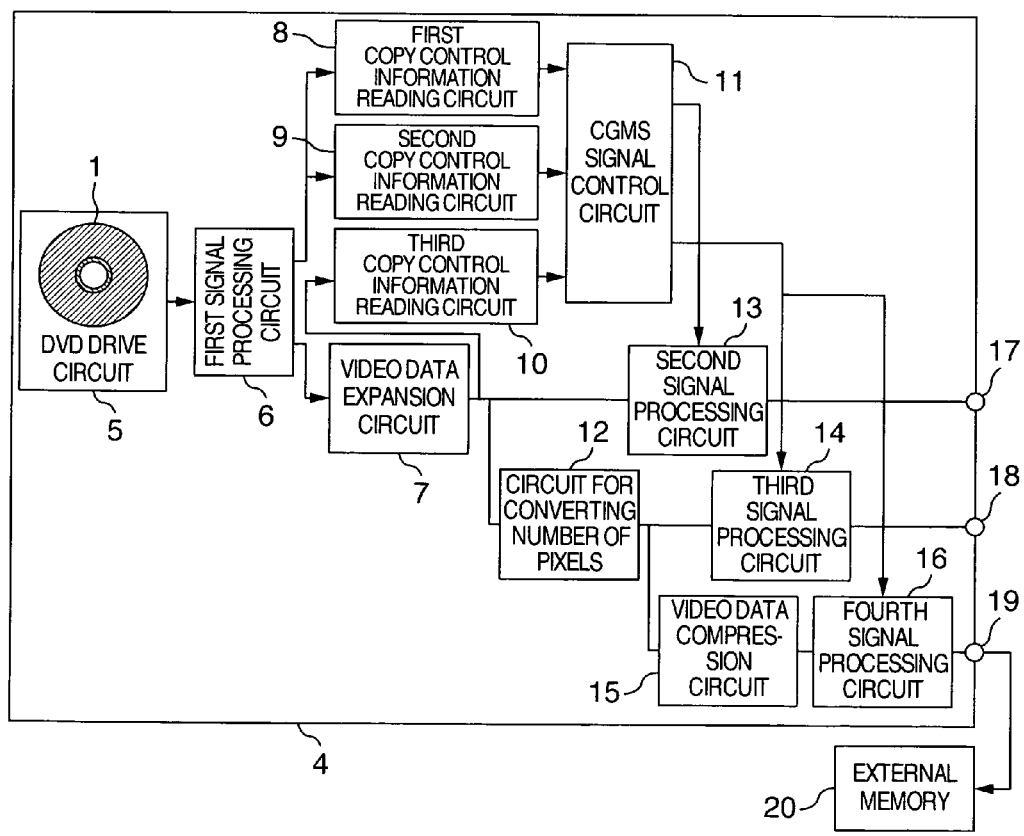
FIG. 2 is a block diagram showing an embodiment of a playback apparatus for a contents distribution medium according to the present invention.

FIG. 2 shows a configuration example of a playback apparatus for the contents distribution medium 1 of the present embodiment.

In FIG. 2, reference numeral 4 denotes a DVD player apparatus corresponding to the new copy control system, 5 a DVD drive circuit, 6 a first signal processing circuit, and 7 a video data expansion circuit according to MPEG2, H.264, AVC, or VC9. Numerals 8, 9 and 10 denote first, second and third copy control information reading circuits, respectively. Numeral 11 denotes a CGMS signal control circuit, and 12 a circuit for converting the number of pixels. Numerals 13, 14 and 16 denote second, third and fourth signal processing circuits, respectively. Numeral 15 denotes a video data compression circuit. Numerals 17, 18 and 19 denote first, second and third video signal output terminals, respectively. Numeral 20 denotes an external memory.

With reference to FIG. 2, digital data recorded on the optical disk medium 1 of the present embodiment is read out by the DVD drive circuit 5, and demodulated by the first signal processing circuit 6. Thus, various data subjected to error correction are taken out. The first copy control information reading circuit 8 detects the new third copy control information read out from the area 2 included in the various data, and determines whether the medium 1 adopts the new copy control system.

The second copy control data reading circuit 9 detects the conventional first copy control information and the new second copy control information in the DVD format form prescribing the CGMS recorded in the area 3, and determines whether the data permits of copying a video signal output restricted in the number of pixels.

Video data included in various kinds of data subjected to error correction are restored to original uncompressed video data by the video data expansion circuit 7.

The third copy control data reading circuit 10 detects the new second copy control information in the water mark form recorded in the area 3 from among the uncompressed video data, and determines whether the new second copy control information permits of copying the video signal output restricted in the number of pixels.

If the CGMS signal control circuit 11 judges the conventional first copy control information read by the reading circuit 9 to prohibit copying, the CGMS signal control circuit 11 sets the CGMS-A and CGMS-D added to the video signal output having no restriction in the number of pixels to copy prohibition.

If any of the reading circuits 8, 9 and 10 judges that "it is permitted to copy a video signal output restricted in the number of pixels", the CGMS signal control circuit 11 sets the CGMS-A and CGMS-D added to the video signal output restricted in the number of pixels to copy-free or copy-one-generation. The role of the reading circuits 8, 9 and 10 is "to prohibit a conventional DVD player which does not conduct copy control according to the new copy control information to conduct copying and permit only a new DVD player according to the new copy control information to conduct copying". Therefore, the control of the CGMS is not restricted to the above-described control, but it is also possible to "permit of copying a video signal output restricted in the number of pixels" only in the case where both the reading circuits 8 and 9 judge copying permitted or in the case where both the reading circuits 8 and 10 judge copying permitted. In addition, when desiring to strictly control the copy permission, it is possible to "permit of copying a video signal output restricted in the number of pixels" only when all of the reading circuits 8, 9 and 10 judge the copying permitted.

The second signal processing circuit 13 adds the CGMS-A or CGMS-D controlled by the CGMS signal control circuit 11 to the uncompressed video data output from the video data expansion circuit 7, and then outputs resultant data to the first video signal output terminal 17.

Another output of the video data expansion circuit 7 is led to the circuit for converting the number of pixels 12. If the number of pixels in the uncompressed video data is 704 by 480, the circuit for converting the number of pixels 12 thins out the number of horizontal pixels 704 to half, i.e., 352 and thereby converts the number of pixels to 352 by 480. The third signal processing circuit 14 adds the CGMS-A or CGMS-D representing copy-free or copy-one-generation to the converted data, and outputs resultant data to the second video signal output terminal 18.

The video data compression circuit 15 for H.264 AVC or VC9 converts the other output of the circuit for converting the number of pixels 12 to compressed video data. The fourth signal processing circuit 16 adds copy control information representing copy-free or copy-one-generation to the uncompressed video data and then outputs resultant data to the third video signal output terminal 19. The output data is recorded in the external memory 20 such as an SD card or a small-sized HDD. In the DVD player apparatus 4 shown in FIG. 2, the video data expansion circuit 7 and the video data compression circuit 15 are incorporated in the same apparatus. Therefore, it is also possible to convey information such as a motion vector detected by the expansion circuit 7 to the compression circuit 15 and form the compression circuit 15 as a compression circuit using the so-called 2-pass scheme, with the intention of improving the compression performance in the compression circuit 15.

FIG. 3 is a table showing an example of conversion contents of the circuit for converting the number of pixels in the present embodiment.

Representative examples of the number of pixels of video data input to the circuit 12 can be broadly classified into three kinds: (A) 704 horizontal by 480 vertical; (B) 640 horizontal by 480 vertical; and (C) 1920 horizontal by 1080 vertical.

On the other hand, the number of pixels on the display mounted on the PMP can be broadly classified into three kinds: (a) 320 to 352 horizontal by 480 vertical; (b) 480 horizontal by 270 vertical; and (c) 320 horizontal by 240 vertical.

The user conducts selection in the table for converting the number of pixels exemplified in FIG. 3 on the basis of the number of pixels in the input signal and the number of pixels in the display of the PMP. If there is a margin in the capacity of the external memory, the user can select a rather large number of pixels giving priority to the picture quality. If there is no margin in the external memory, the user can select a rather small number of pixels at the sacrifice of the picture quality to some extent.

It is also possible to record contents of the table for converting the number of pixels selected by the user (selected result) in the external memory 20 together with the compressed video data, and utilize the recorded contents in the video data expansion processing so as to optimize the played back image when playing back the video data in the PMP.

Only video information has been mentioned with reference to FIGS. 2 and 3. As for audio data as well, conversion suitable for the viewing environment mainly composed of a small-sized memory and a head phone of a PMP is desirable in some cases. In such cases, it is also possible to convert Dolby AC3 or MPEG1 audio data recorded on a contents distribution medium to highly compressed audio data such as MP3 or AAC data, and then record the highly compressed audio data in the external memory together with the above-described video data restricted in the number of pixels and highly compressed.

FIG. 4 shows a configuration example of a PMP having an external memory mounted thereon in the present embodiment.

In FIG. 4, reference numeral 20 denotes an external memory already subjected to recording, 40 a PMP having a small-sized display, 41 a signal processing circuit for playing back recorded video data, 42 an image conversion information readout circuit for reading out pixel conversion information such as the compression scheme and the selected number of pixels, 43 a video data expansion circuit, and 44 a small-sized display.

With reference to FIG. 4, video data recorded in the external memory 20 is read out. Data is demodulated in the signal processing circuit 41. Data subjected to error correction processing is led to the video data expansion circuit 43. The image conversion information readout circuit 42 reads out the compression scheme and the selected number of pixels of the video data, and inputs them to the video data expansion circuit 43. The video data expansion circuit 43 conducts processing such as a selection of an expansion scheme and control on the number of pixels, and outputs uncompressed video data restricted in the number of pixels to the small-sized display 44.

According to the present embodiment, a new copy control rule that prohibits copying a video signal retaining a recording picture quality as before, but permits copy-free or copy-one-generation for a video signal subjected to a picture quality restriction to an extent that there is no inconvenience in enjoying using a PMP has been developed. It is made possible to record movie software restricted in picture quality on a recording medium for PMP. The "ubiquitous movie" business is thus implemented early.

According to the embodiment heretofore described, new copy control information that maintains prohibiting copying for a video signal retaining the recording picture quality as before and permits of copying a video signal restricted in picture quality is added to movie software on a DVD or the like. Thereby, it becomes possible to record the video signal restricted in picture quality on a recording medium for PMP and enjoy movie software on a small-sized display of a PMP easily. As a result, the copyright holder can implement a value added higher than that in the conventional DVD media, in contents distribution media corresponding to the new copy control system. The maker can expand the business of DVD players and PMPs corresponding to the new copy control system. The consumer can enjoy movies early and inexpensively. Therefore, the purpose of contributing to providing the copyright holder, consumer and maker with merits can be achieved.

In the case where a WM is used in the second copy control information in the embodiment of the present invention, it becomes possible to provide a new business model that spreads the WM, together. In other words, the conventional WM has only a purpose of protecting the copyright. Therefore, only the copyright holder is provided with merits. Neither the maker of a device having a WM reading function, nor the end user is provided with merits at all. Therefore, spread of the WM is not implemented. In the present embodiment, the WM provides the maker with an improved value added of the device that "a video signal output restricted in the number of pixels can be copied" and provides the end user with "implementation of ubiquitous movies", in addition to the above-described object.

Even if the first copy control information indicates that copying is prohibited, it may be permitted to copy output video data in the case of "move".

Even if the second copy control information indicates that copying is permitted, copying may be permitted only in the case of "move". In other words, it is also possible to erase video data from an original medium, output data obtained by restricting the number of pixels, and record the output data in a memory or the like.

As heretofore described, the embodiment of the present invention is effective for a PMP system that includes a playback apparatus used to enjoy video information such as movies using a small-sized display in outdoors or the like and that is capable of playing back an external memory such as a small-sized HDD or a flash memory into which video information of a low picture quality restricted in resolution has been copied, using the playback apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

The invention claimed is:

1. A recording/playback scheme for a contents distribution medium corresponding to a new copy control system, at least copy control information, which prescribes a condition concerning copying recorded video information, and compressed video information being recorded on the contents distribution medium, and being played back,
   wherein:
      the video information is provided with first copy control information and second copy control information,
      the first copy control information for a video signal to be output without reducing a resolution is set to a copy-never (copy prohibition) state, and
      the second copy control information for a video signal to be output with reducing a resolution dropped to half or less is set to a copy-free or copy-one-generation state, and
   wherein:
      the compressed video information recorded on the contents distribution medium is expanded,
      a number of all pixels including horizontal and vertical pixels in expanded video information is reduced to half or less, and
      resultant video information is output together with the second copy control information.

2. The recording/playback scheme for a contents distribution medium corresponding to a new copy control system according to claim 1, wherein, on the contents distribution medium,
   the first and second copy control information is multiplexed with the video information as digital additional information, and
   third copy control information indicating that the second copy control information has been added is multiplexed in a region different from a recording area of the video information.

3. The recording/playback scheme for a contents distribution medium corresponding to a new copy control system according to claim 2, wherein:
   the first, second and third copy control information is read from the contents distribution medium,
   a number of all pixels which is a product of a number of horizontal pixels and a number of vertical pixels in the video information is reduced to half or less according to the second and third copy control information, and
   resultant video information is output together with the second copy control information.

4. The recording/playback scheme for a contents distribution medium corresponding to a new copy control system according to claim 1, wherein, on the contents distribution medium,
   the first copy control information is multiplexed with the video information as digital additional information corresponding to CGMS (Copy Generation Management System), and
   the second copy control information is multiplexed as a water mark signal for the video information.

5. A copy control method for controlling copying of a video signal, comprising:
   playing back a video signal having compressed video information, first copy control information for copy prohibition, and second copy control information for copy permission;
   adding the first copy control information to the video signal and outputting a resultant video signal without reducing a resolution; and
   reducing a resolution of the video signal to half or less, adding the second copy control information to the resolution reduced video signal and outputting a resultant video signal,
   wherein the resolution of the video signal is reduced to half or less by expanding the compressed video information during play back, decreasing a number of pixels including horizontal and vertical pixels in expanded video information to half or less, and outputting resultant video information together with the second copy control information as the resultant video signal.

6. The copy control method according to claim 5, wherein the second copy control information for copy permission is information indicating a copy-free or copy-one-generation state.

7. The copy control method according to claim 5, wherein the second copy control information is multiplexed with the video signal by using a water mark.

8. A playback apparatus comprising:
   a playback circuit arranged to play back, from a recording medium, a video signal having compressed video information, first copy control information for copy prohibition and second copy control information for copy permission recorded thereon;
   a first output circuit to add the first copy control information to the video signal and output a resultant video signal without reducing a resolution; and
   a second output circuit to reduce a resolution of the video signal to half or less, add the second copy control information to the resolution reduced video signal and output a resultant video signal,
   wherein the second output circuit is further configured to expand the compressed video information during play back, to reduce a number of pixels including horizontal and vertical pixels in expanded video information to half or less, and to output resultant video information together with the second copy control information, as the resultant video signal.

9. A playback apparatus comprising:

a playback circuit that plays back, from a recording medium, a video signal and first and second copy control information recorded thereon;

a copy control information reading circuit that detects the first and second copy control information played back by said playback circuit;

an expansion circuit that expands the video signal played back by said playback circuit;

a pixel conversion circuit that converts a number of pixels to decrease a number of pixels of the video signal expanded by said expansion circuit;

a compression circuit that compresses the video signal converted in the number of pixels by said pixel conversion circuit;

a first signal processing circuit that adds a CGMS (Copy Generation Management System) signal to the video signal expanded by said expansion circuit;

a second signal processing circuit that adds a CGMS signal to the video signal converted in the number of pixels by said pixel conversion circuit;

a third signal processing circuit that adds a CGMS signal to the video signal compressed by said compression circuit;

a CGMS signal control circuit that sets contents of the CGMS signal on a basis of contents of the first and second copy control information detected by said copy control information reading circuit and outputs the CGMS signal to said first, second and third signal processing circuits;

a first output terminal that outputs the video signal subjected to signal processing in said first signal processing circuit;

a second output terminal that outputs the video signal subjected to signal processing in said second signal processing circuit;

a third output terminal that outputs the video signal subjected to signal processing in said third signal processing circuit;

wherein:

in case that the first copy control information detected by said copy control information reading circuit indicates copy prohibition, said CGMS signal control circuit sets the CGMS signal to copy prohibition and outputs the CGMS signal to said first signal processing circuit, and said first signal processing circuit adds the CGMS signal set to copy prohibition to the expanded video signal, in case that the second copy control information detected by said copy control information reading circuit indicates copy permission, said CGMS signal control circuit sets the CGMS signal to copy permission and outputs the CGMS signal to said second signal processing circuit, and said second signal processing circuit adds the CGMS signal set to copy permission to the video signal converted in the number of pixels, and in case that the second copy control information detected by said copy control information reading circuit indicates copy permission, said CGMS signal control circuit sets the CGMS signal to copy permission and outputs the CGMS signal to said third signal processing circuit, and said third signal processing circuit adds the CGMS signal set to copy permission to the compressed video signal.

* * * * *